(12) United States Patent
Vallette et al.

(10) Patent No.: US 9,366,282 B2
(45) Date of Patent: Jun. 14, 2016

(54) TORQUE CONTROLLING BREAK SCREW (71) Applicant: Thomas & Betts International LLC, Wilmington, DE (US)

(72) Inventors: Ronald Vallette, Ormond Beach, FL (US); James Zahnen, Ormond Beach, FL (US); William Longcor, IV, Newton, NJ (US); Stanley Szyszko, Wall, NJ (US); Matthew Cawood, Deleon Springs, FL (US); Robert Fong, Bethlehem, PA (US)

(73) Assignee: Thomas & Betts International LLC, Wilmington, DE (US)

( * ) Notice: Subject to any disclaimer, the term of this patent is extended or adjusted under 35 U.S.C. 154(b) by 47 days.

(21) Appl. No.: 14/466,439

(22) Filed: Aug. 22, 2014

(65) Prior Publication Data

US 2015/0071728 A1    Mar. 12, 2015

Related U.S. Application Data

(60) Provisional application No. 61/874,462, filed on Sep. 6, 2013.

(51) Int. Cl.
| | |
|---|---|
| *F16B 31/02* | (2006.01) |
| *F16B 39/04* | (2006.01) |
| *F16B 39/06* | (2006.01) |
| *F16B 39/22* | (2006.01) |
| *H01R 4/36* | (2006.01) |
| *F16B 2/06* | (2006.01) |

(52) U.S. Cl.
CPC ............ *F16B 31/02* (2013.01); *F16B 2/065* (2013.01); *F16B 31/021* (2013.01); *F16B 39/04* (2013.01); *F16B 39/06* (2013.01); *F16B 39/225* (2013.01); *H01R 4/36* (2013.01)

(58) Field of Classification Search
CPC ...... F16B 31/02; F16B 31/021; F16B 35/005; F16B 35/041; F16B 39/12; F16B 39/22; F16B 39/225; F16B 39/34
USPC .................................. 411/1–6, 390, 393, 395
See application file for complete search history.

(56) References Cited

U.S. PATENT DOCUMENTS

| | | | |
|---|---|---|---|
| 2,400,348 A | 5/1946 | Greene | |
| 2,616,475 A * | 11/1952 | Koza | F16B 35/005 411/298 |
| 3,370,341 A | 2/1968 | Allsop | |
| 3,444,775 A * | 5/1969 | Hills | F16B 31/021 411/3 |
| 3,512,447 A * | 5/1970 | Vaughn | F16B 31/021 411/5 |

(Continued)

FOREIGN PATENT DOCUMENTS

| | | |
|---|---|---|
| AU | 2008202943 A1 | 2/2009 |
| CA | 2178769 | 4/2002 |

(Continued)

OTHER PUBLICATIONS http://www.te.com/us/en/industries/energy/pdf/e247.pdf http://powerpoint-engineering.com/product/m2-240/ http://www.pfisterer.com/download_download/d_1185_en.pdf.

*Primary Examiner* — Roberta Delisle
(74) *Attorney, Agent, or Firm* — Hoffmann & Baron, LLP (57) ABSTRACT

A torque controlling break screw is provided for securing a wire or cable within a connector. The break screw comprises a nut, a thin-walled, hollow screw and a torque limiting feature between the nut and the screw.

20 Claims, 9 Drawing Sheets

(56) References Cited

U.S. PATENT DOCUMENTS

| | | | | |
|---|---|---|---|---|
| 3,520,222 | A * | 7/1970 | Placek | F16B 21/186 411/353 |
| 3,742,583 | A | 7/1973 | Devlin et al. | |
| 3,796,125 | A | 3/1974 | Campbell et al. | |
| 3,937,121 | A | 2/1976 | Schubert | |
| 3,963,322 | A | 6/1976 | Gryctko | |
| 4,502,825 | A | 3/1985 | Yamada | |
| 4,545,712 | A * | 10/1985 | Wallace | F16B 33/06 411/258 |
| 4,659,267 | A | 4/1987 | Uno et al. | |
| 5,407,312 | A * | 4/1995 | Terrizzi | F16B 33/004 411/304 |
| 5,584,626 | A * | 12/1996 | Assmundson | F16B 31/021 411/1 |
| 5,624,216 | A | 4/1997 | Detable et al. | |
| 5,713,705 | A * | 2/1998 | Grunbichler | F16B 31/021 411/410 |
| 5,857,816 | A * | 1/1999 | Assmundson | F16B 31/02 411/1 |
| 6,024,600 | A * | 2/2000 | Daoud | F16B 35/041 174/51 |
| 6,042,430 | A * | 3/2000 | Hollick | F16B 31/021 411/309 |
| 6,056,471 | A | 5/2000 | Dinitz | |
| 6,176,659 | B1 | 1/2001 | Hardt et al. | |
| 6,884,124 | B1 | 4/2005 | Luzzi | |
| 6,896,462 | B2 | 5/2005 | Stevenson et al. | |
| 7,214,108 | B2 * | 5/2007 | Barnett | F16B 31/021 439/797 |
| 7,249,982 | B1 | 7/2007 | Craig | |
| 7,775,754 | B2 | 8/2010 | Calandra et al. | |
| 8,016,622 | B2 | 9/2011 | Battle | |
| 8,317,443 | B2 | 11/2012 | Stauch et al. | |
| 2008/0226411 | A1 | 9/2008 | McKinlay | |
| 2009/0087280 | A1 * | 4/2009 | Harnetiaux | F16B 39/04 411/436 |
| 2010/0120300 | A1 | 5/2010 | Battle | |
| 2011/0318953 | A1 | 12/2011 | Battle | |

FOREIGN PATENT DOCUMENTS

| | | |
|---|---|---|
| CA | 2364325 | 6/2002 |
| CA | 103697 | 3/2004 |
| CA | 2282712 | 8/2007 |
| CA | 139131 | 9/2011 |
| DE | 4113242 A1 | 10/1992 |
| EP | 1626187 | 2/2006 |
| EP | 2381534 | 10/2011 |
| EP | 2498339 A1 | 9/2012 |
| GB | 1413773 A | 11/1975 |
| WO | WO9525229 | 9/1995 |
| WO | WO2012055599 | 5/2012 |

* cited by examiner

TORQUE CONTROLLING BREAK SCREW

CROSS-REFERENCE TO RELATED APPLICATION

This application claims priority under 35 U.S.C. §119, based on U.S. Provisional Patent Application No. 61/874,462, filed on Sep. 6, 2013, the disclosure of which is hereby incorporated by reference herein.

FIELD OF THE INVENTION

In general, the present invention relates to a torque controlling break screw which has a torque limiting feature between a nut and a screw which must be overcome by force to break the nut free from the screw. The screw body is also hollow such that an even greater force is required for the nut to shear off excess length of the screw body.

BACKGROUND

In the connector industry, often times shear bolts and screws are used to serve the dual function of securing a wire in a connector and providing a screw that will break off at some position above the connector housing. There are two disadvantages to current designs of these shear bolts and screws. The first disadvantage is that they are expensive to manufacture or require special tools to use. The second disadvantage is that the screw or bolt length is fixed, which prevents these types of screws or bolts from being used in medium voltage connectors which require the screw to break at or below the surface of the connector. The two greatest functions needed of these types of bolts or screws are that they should allow only the required force applied to the conductor within the connector and that the excess screw length should be broken off at or below the surface of the connector body. Unfortunately, current designs do not meet both of these needs without the use of multiple break points on the screw or bolt body or without the use of special tools to achieve these functions.

SUMMARY OF THE INVENTION

The present invention provides a torque controlling break screw for securing a wire or cable conductor within a connector. There is a torque limiting feature between a thin-walled, hollow screw and a nut, and the nut is secured at a distal end of the screw and is used to tighten the screw into the connector. Once the strength of the torque limiting feature that secures the nut onto the distal end of the screw is exceeded, the nut breaks loose from the distal end of the screw so that it can travel down the shaft of the screw until the nut contacts the surface of the connector. A higher force is then applied to the nut which allows the excess shaft length of the thin-walled, hollow screw to be sheared off so that the screw is flush with the surface of the connector. An optional removal feature is also provided so that the screw can be backed out of the connector, if necessary, to allow removal of the wire or cable from the connector.

DETAILED DESCRIPTION OF THE PREFERRED EMBODIMENT(S)

The above and other features, aspects and advantages of the present invention will now be discussed in the following detailed description of preferred embodiments and appended claims, which are to be considered in conjunction with the accompanying drawings in which identical reference characters designate like elements throughout the views.

Figure 1:
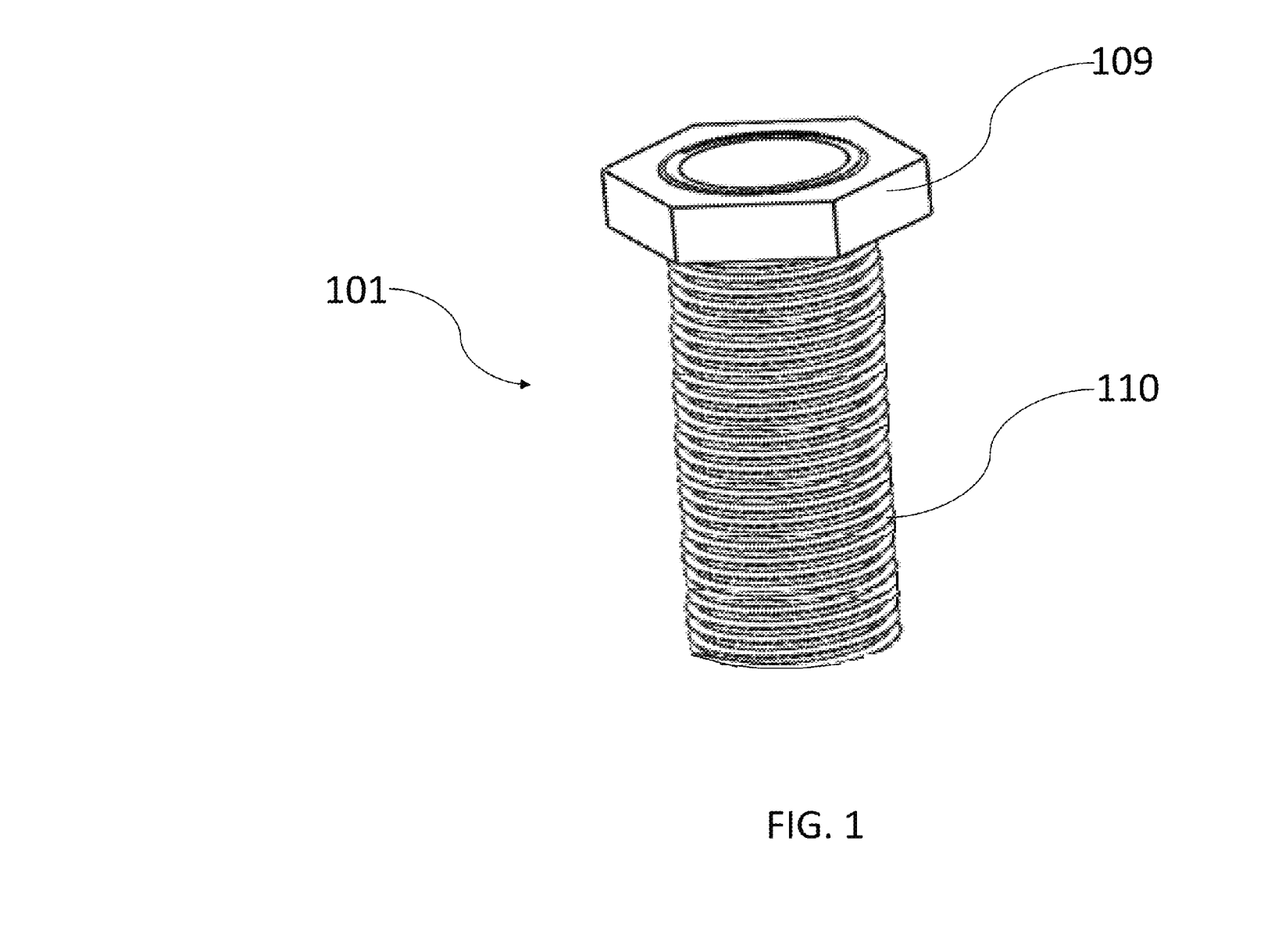
FIG. 1 is a front perspective view showing the torque controlling break screw of the present invention.

Shown in FIG. 1 is a torque controlling break screw 101 of the present invention. The torque controlling break screw 101 is comprised of a combination of a threaded, thin-walled, hollow screw body 110 and a nut 109 that is attached to a distal end of the screw body 110. The nut 109 is held in place on the screw body 110 by a torque limiting feature, to be described later, until a certain force is applied to the nut 109 which exceeds the strength of the torque limiting feature.

Figure 2:
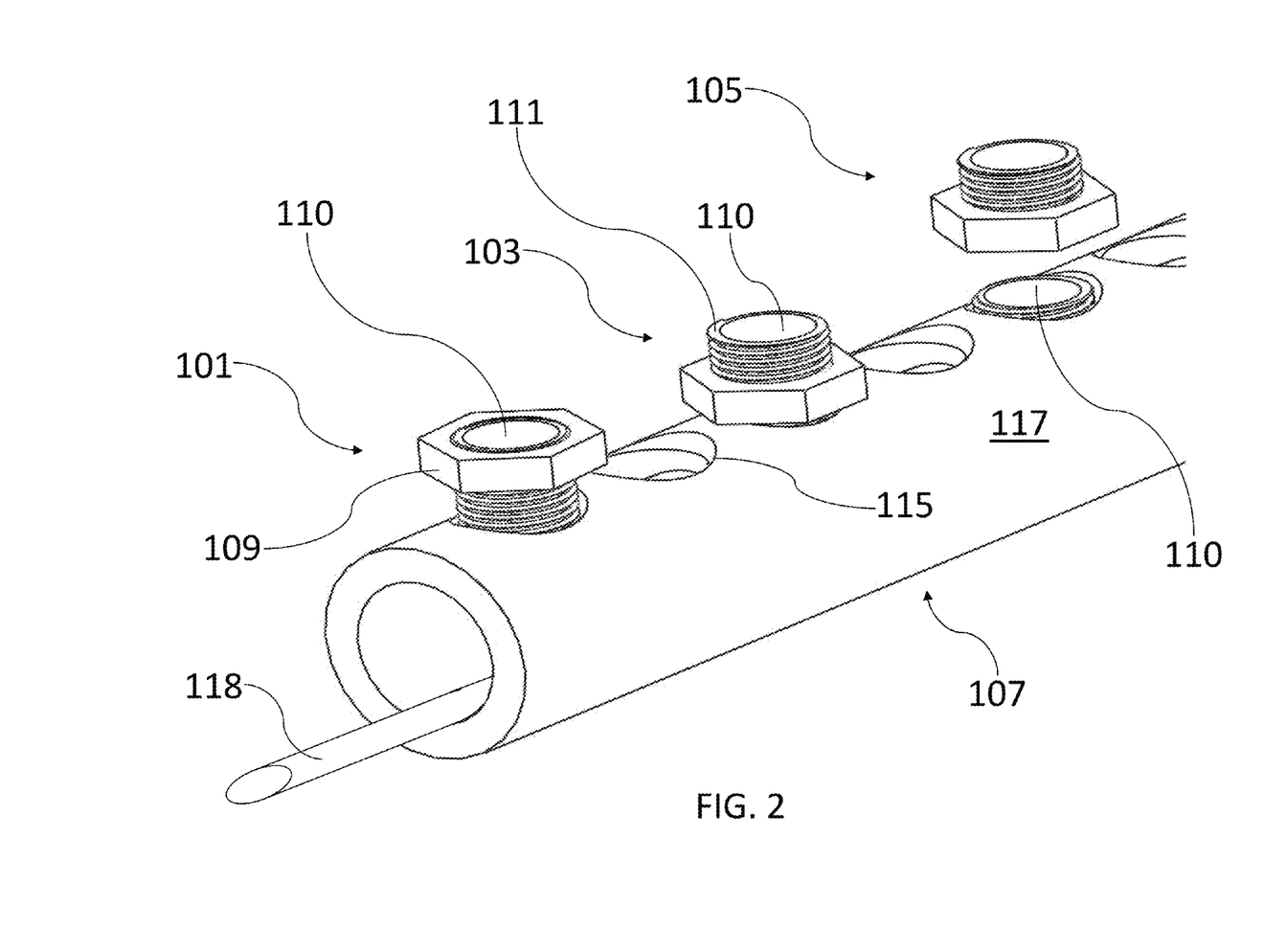
FIG. 2 is a front perspective view showing the various stages of using the torque controlling break screw of the present invention.

Shown in FIG. 2 is a sequence of steps to follow to use the torque controlling break screw 101 to secure a conductor 118, such as a wire or cable, within a connector 107. FIG. 2 shows the intact torque controlling break screw 101 screwed into an aperture 115, and already screwed down into position within the connector 107 on the leftmost side of the figure. In this position, the torque controlling break screw 101 is in contact with the conductor 118 so that the conductor 118 is secured against the connector 107. Again in FIG. 2, shown in the middle of the figure, a force has been applied to the nut 109 which exceeds the strength of the torque limiting feature that held the nut 109 in place at the distal end of the screw body 110 and enabled the torque controlling break screw 101 to be screwed down into position, as shown at 103 in the middle of the figure, such that the nut 109 breaks loose from the distal end of the screw body 110 allowing it to travel down the length of the screw body 110 until it contacts the surface 117 of the connector 107. The target force that must be applied to the nut to exceed the strength of the torque limiting feature should be approximately 250 in-lbs at a minimum.

Figure 4:
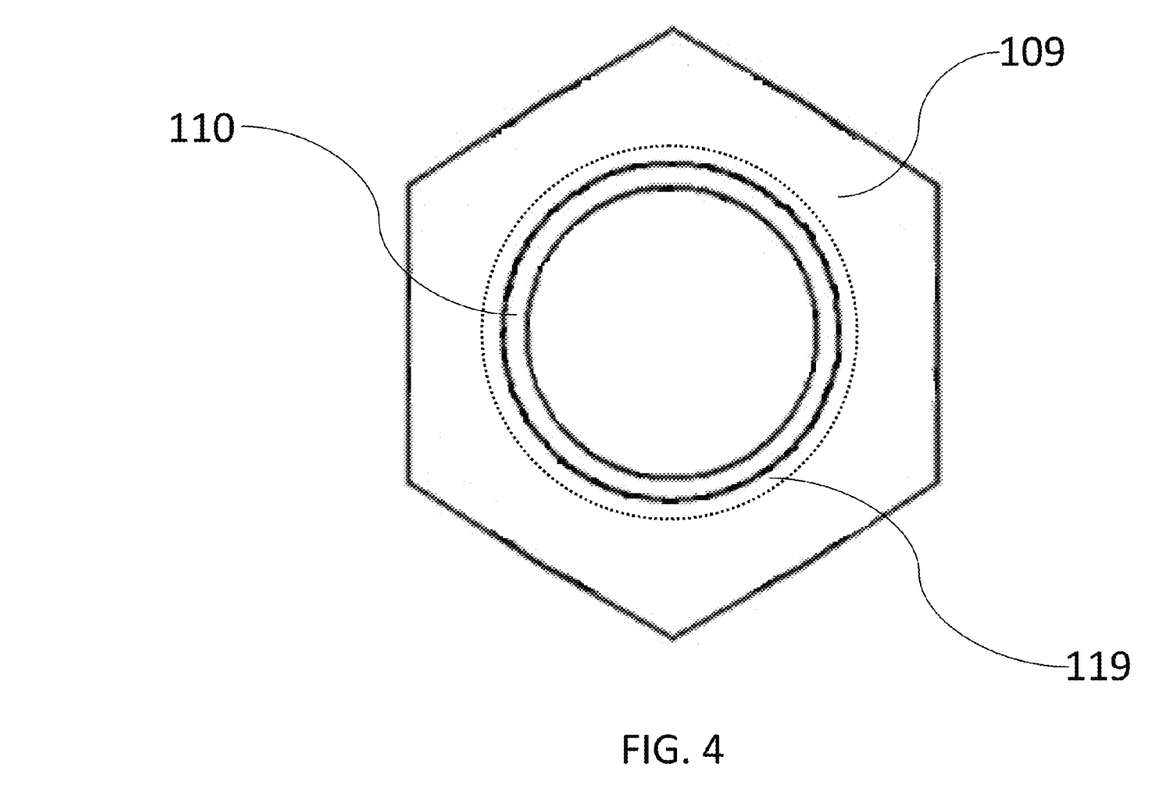
FIG. 4 is a plan view of a chemical compound epoxy torque limiting feature of the torque controlling break screw of the present invention.
Figure 5:
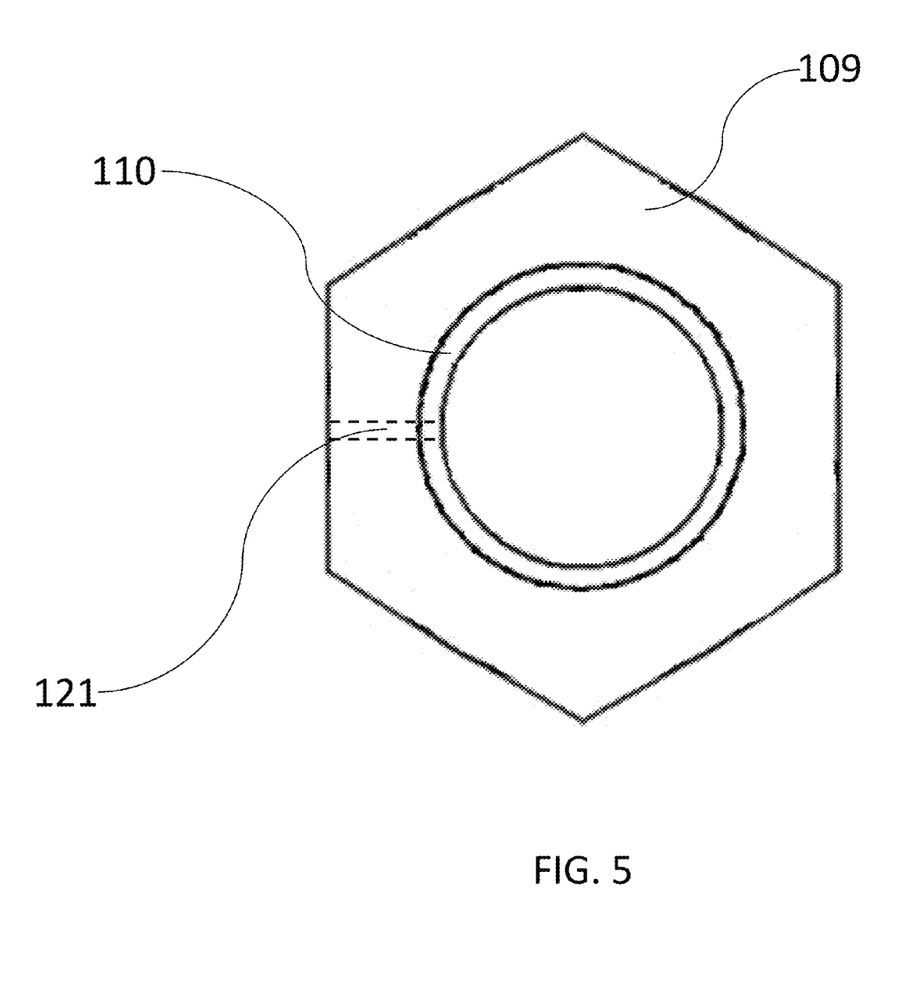
FIG. 5 is a plan view of a shear pin torque limiting feature of the torque controlling break screw of the present invention.
Figure 6:
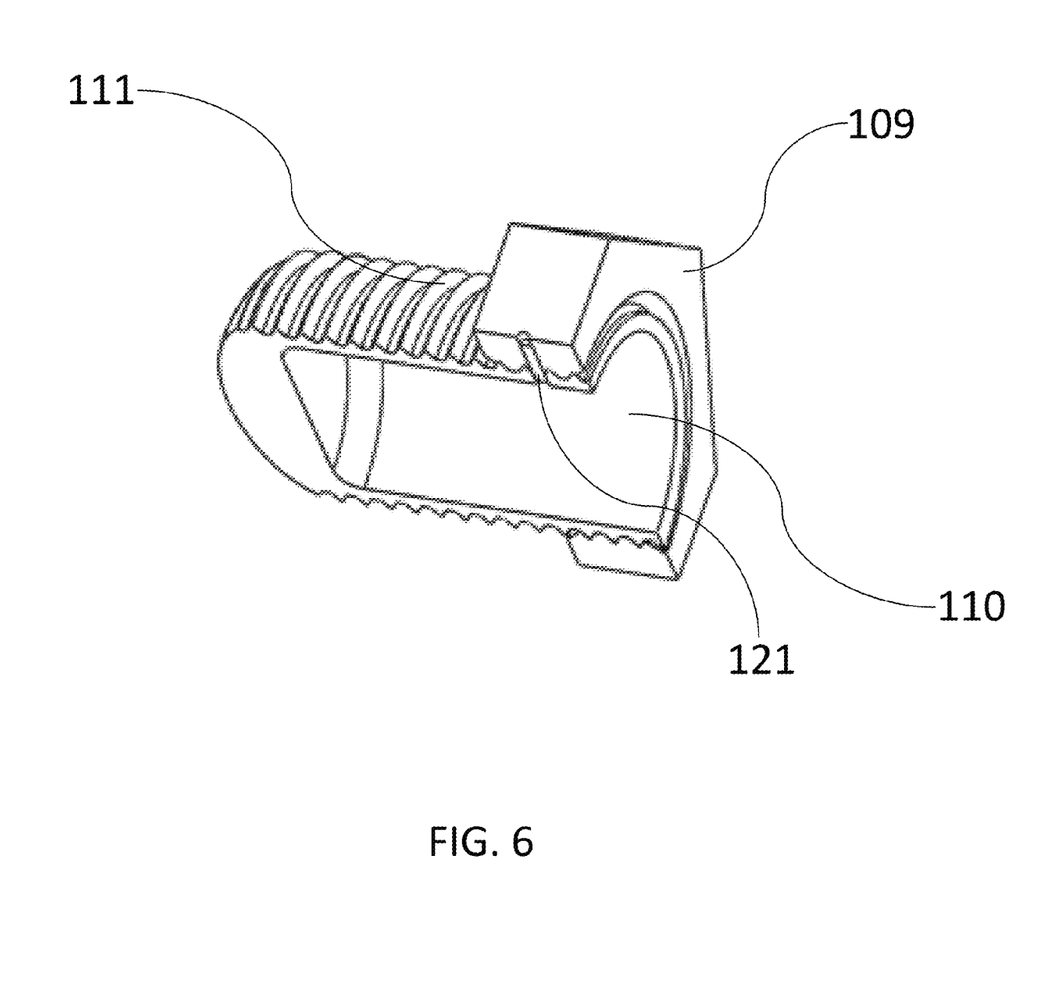
FIG. 6 is a side perspective cross-sectional view of a shear pin torque limiting feature of the torque controlling break screw of the present invention.
Figure 7:
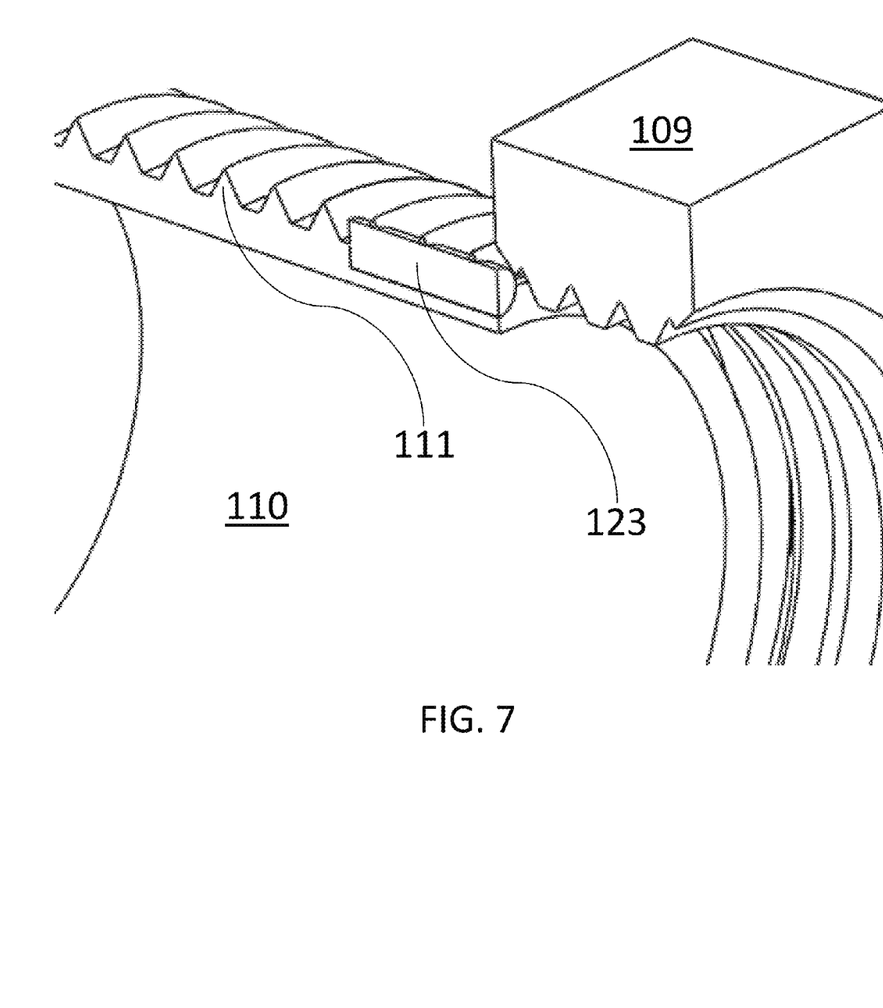
FIG. 7 is a side perspective cross-sectional view of a thread insert torque limiting feature of the torque controlling break screw of the present invention.
Figure 8:
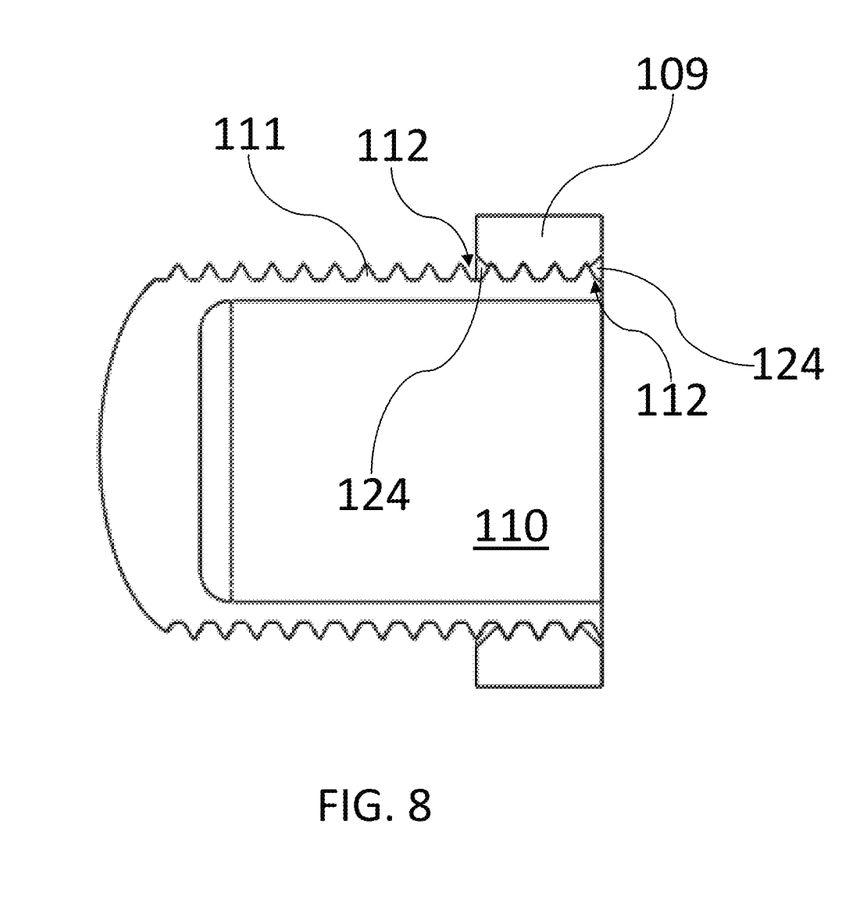
FIG. 8 is a cross-sectional elevation view of a thread lock torque limiting feature of the torque controlling break screw of the present invention.

There are four options for the torque limiting feature between the nut 109 and the screw body 110. The first and preferred option, shown in FIG. 4 is a chemical thread locking compound 119, such as an epoxy, which bonds the nut 109 to the thin-walled, hollow screw body 110. Any force that is applied to the nut 109 which is greater than the bonding strength of the chemical compound 119 that is between the nut 109 and the screw body 110 will cause the nut 109 to be loosened from the screw body 110 and allow the nut 109 to travel along the screw threads 111 of the screw body 110 until the nut 109 contacts the surface 117 of the connector 107, as shown in the middle of FIG. 2. A second option, shown in FIG. 5 and FIG. 6, is a shear pin 121 that is located between the nut 109 and the screw body 110. The shear pin 121 may be made of a plastic or metal material. Similar to the chemical compound 119 described above, any force that is applied to the nut 109 which is greater than the shear strength of the shear pin 121 that is between the nut 109 and the screw body 110 will cause the shear pin 121 to be sheared at the location where it connects the nut 109 to the screw body 110, thereby causing nut 109 to break free from its position at the distal end of the screw body 110 and allowing the nut 109 to travel along the screw threads 111 of the screw body 110 until the nut 109 contacts the surface 117 of the connector 107, as shown in the middle of FIG. 2. A third option of the torque limiting feature, shown in FIG. 7, is a thread insert 123 that is located within a slot in the screw threads 111 immediately below the nut 109 and which runs perpendicular to the threads 111. The thread insert 123 may be made of a plastic material that the nut 109 can break through when enough force is applied to the nut 109 to exceed the strength of the thread insert 123. Like the chemical compound 119 or the shear pin 121, once the strength of the thread insert 123 is exceeded, it will cause the nut 109 to break free from its position at the distal end of the screw body 110 and allow the nut 109 to travel along the screw threads 111 of the screw body 110 until the nut 109 contacts the surface 117 of the connector 107. Finally, a fourth option of the torque limiting feature is a thread lock 124, which is shown in FIG. 8. Similar to the thread insert 123, the thread lock 124 may be made of a plastic material. The thread lock 124 is located in the grooves 112 of the threads 111 which are immediately adjacent to the nut 109 at the distal end of the screw body 110. As with the other options of the torque limiting feature that have been discussed, once the strength of the thread lock 124 is exceeded, it will cause the nut 109 to break free from its position at the distal end of the screw body 110 and allow the nut 109 to travel along the screw threads 111 of the screw body 110 until the nut 109 contacts the surface 117 of the connector 107.

Figure 9:
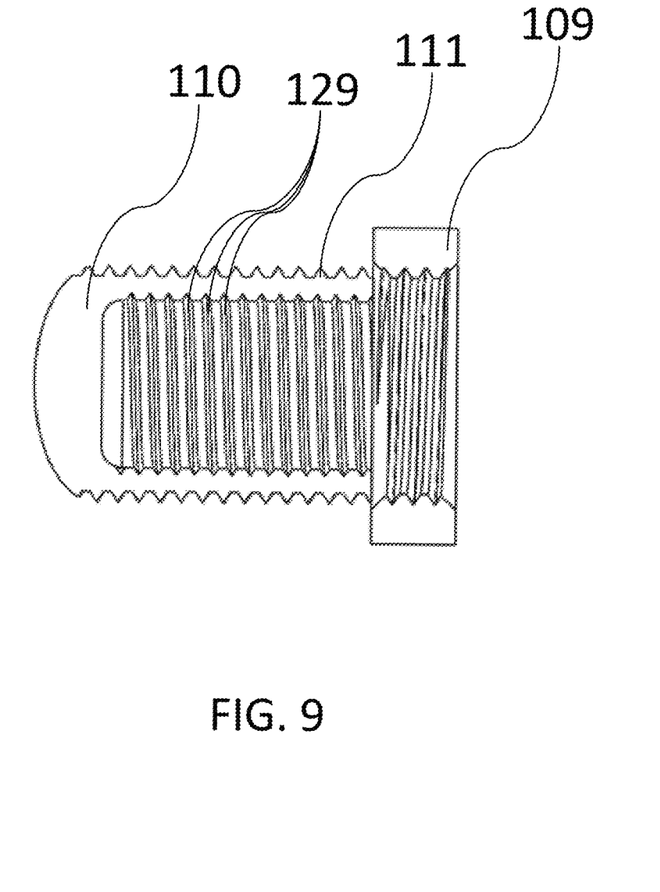
FIG. 9 is a cross-sectional elevation view of the torque controlling break screw of the present invention comprised of spiral grooves on the inside of the hollow screw body.
Figure 10:
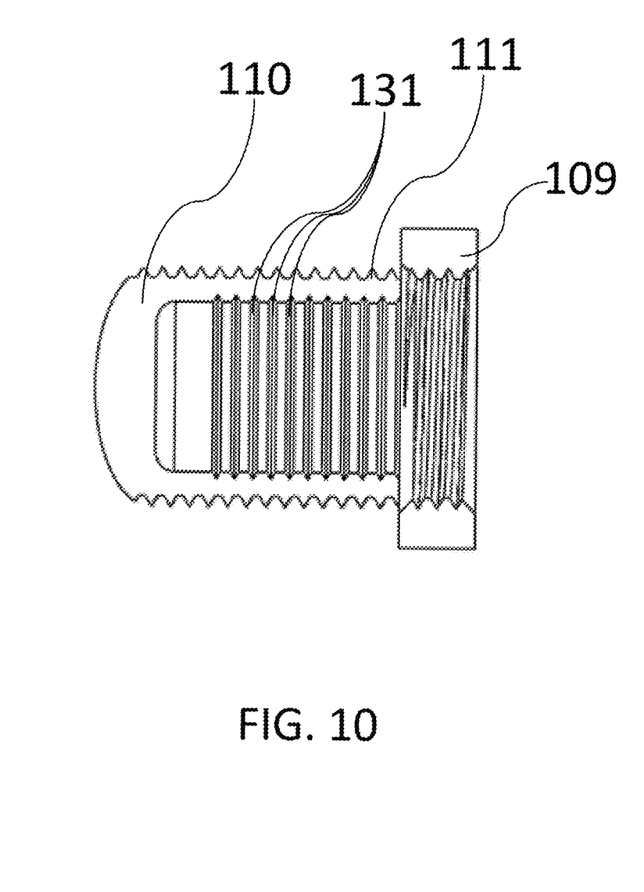
FIG. 10 is a cross-sectional elevation view of the torque controlling break screw of the present invention comprised of discrete grooves on the inside of the hollow screw body.

Shown in FIG. 2, on the rightmost side of the figure, another yet greater force is applied to the nut 109 after it has broken free from its position at the distal end of the screw body 110. After the nut 109 is fully contacting the surface 117 of the connector 107 after having traveled down the length of the screw body 110, a force is applied to the nut 109 which is greater than the shear strength of the hollow body screw 110, causing the excess length 105 of the screw body 110 protruding from the surface 117 of the connector 107 to be broken off so that the remainder of the screw 110 is flush with the connector 107. This leaves a clean installation of the screw 110 securing the conductor 118 within the connector 107, thereby making it possible for the torque controlling break screw 101 to be used in installations with medium voltage connectors that require the screw to break at or below the surface of the connector. The screw body 110 may also be further comprised of spiral grooves 129, shown in FIG. 9, or discrete grooves 131, shown in FIG. 10, which line the inside of the hollow screw body and allow for a cleaner break at the top of the remaining screw body when the excess screw body is sheared off by the nut when compared to the thin-walled, hollow screw body without either spiral grooves 129 or discrete grooves 131. The target force that must be applied to the nut to exceed the shear strength of the thin-walled, hollow body screw should be approximately 350 in-lbs at a minimum.

Figure 3:
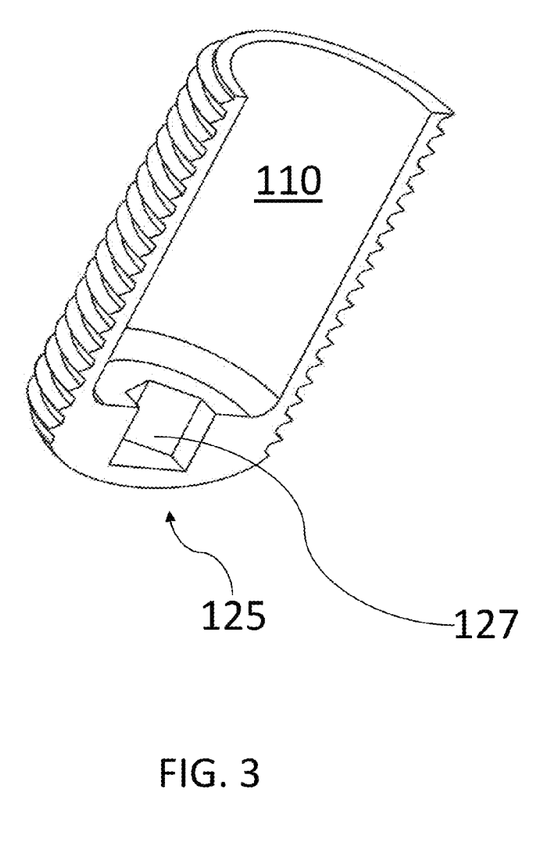
FIG. 3 is a cross-sectional view of a screw body with a recessed portion of the torque controlling break screw of the present invention.

Shown in FIG. 3 is a removal feature of the threaded, thin-walled, hollow screw body 110. FIG. 3 shows an interior bottom surface 125 of the screw body 110 that contains a recessed portion 127 shaped to fit a hex key or Allen key. This recessed portion 127 on the bottom surface 125 of the interior of the screw body 110 allows the remaining screw body to be backed out from the connector 107 after installation, if necessary, through the use of a hex key or Allen key. This removal feature allows the conductor 118 to be removed from the connector 107 at some point after installation if this is ever required, thereby preventing the torque controlling break screw from being permanently installed in a connector.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A torque controlling break screw for securing a wire or cable within a connector, the torque controlling break screw comprising:
    a threaded, thin-walled screw body;
    a nut secured at a distal end of the screw body;
    a torque limiting feature which keeps the nut secured at the distal end of the screw body;
    wherein the screw and nut combination are screwed into an aperture within the connector until the screw contacts a conductor housed within the connector body;
    wherein when a force is applied to the nut which exceeds the strength of the torque limiting feature, it causes the nut to break loose from the distal end of the screw by overcoming the torque limiting feature so that it can travel down the length of the screw body until it contacts the connector; and
    wherein when an even greater force is applied to the nut when in contact with the connector body, it exceeds the shear strength of the screw body and causes the excess length of the screw body to be sheared off such that the remaining screw is flush with the surface of the connector.

2. The torque controlling break screw for securing a wire or cable within a connector of claim 1, wherein the torque limiting feature which keeps the nut secured at the distal end of the screw body is comprised of a chemical thread locking epoxy compound located between the nut and the distal end of the screw body.

3. The torque controlling break screw for securing a wire or cable within a connector of claim 1, wherein the torque limiting feature which keeps the nut secured at the distal end of the screw body is a shear pin that extends through the nut and extends through the screw body.

4. The torque controlling break screw for securing a wire or cable within a connector of claim 1, wherein the torque limiting feature which keeps the nut secured at the distal end of the screw body is a thread insert that is comprised of material located within a slot in the screw threads which runs perpendicular to the screw threads and is located immediately below the nut.

5. The torque controlling break screw for securing a wire or cable within a connector of claim 1, wherein the torque limiting feature which keeps the nut secured at the distal end of the screw body is a thread lock that is comprised of material located in the grooves of the threads which are immediately adjacent to the nut at the distal end of the screw body.

6. The torque controlling break screw for securing a wire or cable within a connector of claim 1, wherein the threaded, thin-walled screw body is further comprised of spiral grooves on the inside of the screw body in order to provide a clean break of the screw body when it is sheared off by the nut.

7. The torque controlling break screw for securing a wire or cable within a connector of claim 1, wherein the threaded, thin-walled screw body is further comprised of discrete grooves on the inside of the screw body in order to provide a clean break of the screw body when it is sheared off by the nut.

8. The torque controlling break screw for securing a wire or cable within a connector of claim 1, further comprising:
an interior bottom surface of the threaded, thin-walled screw body that contains a recessed portion shaped to fit a hex key or Allen key, and
a hollow inside portion of the screw body, the hollow inside portion being larger across than the recessed portion;
wherein the screw body hollow inside portion is adapted to pass the Allen key from the distal end of the screw body downward to be received in the recessed portion, so that the remaining screw body which is flush with the surface of the connector can be backed out from the connector to be removed, if necessary.

9. The torque controlling break screw for securing a wire or cable within a connector of claim 1, wherein the force that is required to break the nut loose from being secured at the distal end of the screw body and overcome the torque limiting feature must exceed 250 in-lbs.

10. The torque controlling break screw for securing a wire or cable within a connector of claim 1, wherein the force applied to the nut that is required to shear the excess length of the screw body from the surface of the connector so that the remaining screw body is flush with the connector must exceed 350 in-lbs.

11. A torque controlling break screw for securing a wire or cable within a connector, the torque controlling break screw comprising:
a threaded, thin-walled screw body;
a nut secured at a distal end of the screw body;
a torque limiting feature which keeps the nut secured at the distal end of the screw body which is comprised of a chemical thread locking epoxy compound located between the nut and the distal end of the screw body;
wherein the screw and nut combination are screwed into an aperture within the connector until the screw contacts a conductor housed within the connector body;
wherein when a force is applied to the nut which exceeds the strength of the torque limiting feature, it causes the nut to break loose from the distal end of the screw by overcoming the torque limiting feature so that it can travel down the length of the screw body until it contacts the connector; and
wherein when an even greater force is applied to the nut when in contact with the connector body, it exceeds the shear strength of the screw body and causes the excess length of the screw body to be sheared off such that the remaining screw is flush with the surface of the connector.

12. The torque controlling break screw for securing a wire or cable within a connector of claim 11, wherein the threaded, thin-walled screw body is further comprised of spiral grooves or discrete grooves on the inside of the screw body in order to provide a clean break of the screw body when it is sheared off by the nut.

13. The torque controlling break screw for securing a wire or cable within a connector of claim 11, further comprising:
an interior bottom surface of the threaded, thin-walled screw body that contains a recessed portion shaped to fit a hex key or Allen key, and
a hollow inside portion of the screw body, the hollow inside portion being larger across than the recessed portion;
wherein the screw body hollow inside portion is adapted to pass the Allen key from the distal end of the screw body downward to be received in the recessed portion, so that the remaining screw body which is flush with the surface of the connector can be backed out from the connector to be removed, if necessary.

14. The torque controlling break screw for securing a wire or cable within a connector of claim 11, wherein the force that is required to break the nut loose from being secured at the distal end of the screw body and overcome the torque limiting feature must exceed 250 in-lbs.

15. The torque controlling break screw for securing a wire or cable within a connector of claim 11, wherein the force applied to the nut that is required to shear the excess length of the screw body from the surface of the connector so that the remaining screw body is flush with the connector must exceed 350 in-lbs.

16. A torque controlling break screw for securing a wire or cable within a connector, the torque controlling break screw comprising:
a threaded, thin-walled screw body with spiral or discrete grooves on the inside of the screw body;
a nut secured at a distal end of the screw body;
a torque limiting feature which keeps the nut secured at the distal end of the screw body;
wherein the screw and nut combination are screwed into an aperture within the connector until the screw contacts a conductor housed within the connector body;
wherein when a force greater than 250 in-lbs is applied to the nut, which exceeds the strength of the torque limiting feature, it causes the nut to break loose from the distal end of the screw by overcoming the torque limiting feature so that it can travel down the length of the screw body until it contacts the connector;
wherein when another force greater than 350 in-lbs is applied to the nut when in contact with the connector body, it exceeds the shear strength of the screw body and causes the excess length of the screw body to be sheared off such that the remaining screw is flush with the surface of the connector; and
wherein the threaded, thin-walled screw body further comprises an interior bottom surface that contains a recessed portion shaped to fit a hex key or Allen key so that the remaining screw body which is flush with the surface of the connector can be backed out from the connector to be removed, if necessary.

17. The torque controlling break screw for securing a wire or cable within a connector of claim 16, wherein the torque limiting feature which keeps the nut secured at the distal end of the screw body is comprised of a chemical thread locking epoxy compound located between the nut and the distal end of the screw body.

18. The torque controlling break screw for securing a wire or cable within a connector of claim 16, wherein the torque limiting feature which keeps the nut secured at the distal end of the screw body is a shear pin that extends through the nut and extends through the screw body.

19. The torque controlling break screw for securing a wire or cable within a connector of claim 16, wherein the torque limiting feature which keeps the nut secured at the distal end of the screw body is a thread insert that is comprised of material located within a slot in the screw threads which runs perpendicular to the screw threads and is located immediately below the nut.

20. The torque controlling break screw for securing a wire or cable within a connector of claim 16, wherein the torque limiting feature which keeps the nut secured at the distal end of the screw body is a thread lock that is comprised of material located in the grooves of the threads which are immediately adjacent to the nut at the distal end of the screw body.

* * * * *